(12) United States Patent
Valadez et al.

(10) Patent No.: US 8,331,641 B2
(45) Date of Patent: Dec. 11, 2012

(54) SYSTEM AND METHOD FOR AUTOMATICALLY CLASSIFYING REGIONS-OF-INTEREST

(75) Inventors: Gerardo Hermosillo Valadez, West Chester, PA (US); Bing Jian, Exton, PA (US); Yoshihisa Shinagawa, Downingtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 634 days.

(21) Appl. No.: 12/549,381

(22) Filed: Aug. 28, 2009

(65) Prior Publication Data

US 2010/0111392 A1   May 6, 2010

Related U.S. Application Data

(60) Provisional application No. 61/110,617, filed on Nov. 3, 2008.

(51) Int. Cl.
*G06K 9/00* (2006.01)
*A61B 6/04* (2006.01)

(52) U.S. Cl. .......................... 382/131; 378/37
(58) Field of Classification Search .................. 382/131; 378/4, 37

See application file for complete search history.

(56) References Cited

U.S. PATENT DOCUMENTS

| | | | | | |
|---|---|---|---|---|---|
| 5,625,705 | A | * | 4/1997 | Recht | 382/128 |
| 5,799,100 | A | * | 8/1998 | Clarke et al. | 382/132 |
| 5,982,917 | A | * | 11/1999 | Clarke et al. | 382/132 |
| 7,736,313 | B2 | * | 6/2010 | Luo et al. | 600/437 |
| 8,090,177 | B2 | * | 1/2012 | Venkataraman et al. | 382/130 |
| 2005/0027188 | A1 | * | 2/2005 | Metaxas et al. | 600/410 |
| 2006/0177125 | A1 | * | 8/2006 | Chan et al. | 382/154 |
| 2009/0226065 | A1 | * | 9/2009 | Chen | 382/131 |

OTHER PUBLICATIONS

Debra M. Ikeda et al., Development, Standardization, and Testing of a Lexicon for Reporting Contrast-Enhanced Breast Magnetic Resonance Imaging Studies, Journal of Magnetic Resonance Imaging, 2001, pp. 889-895, vol. 13, Wiley-Liss, Inc.

Bernard Fisher et al., Twenty-Year Follow-Up of a Randomized Trial Comparing Total Mastectomy, Lumpectomy, and Lumpectomy Plus Irradiation for the Treatment of Invasive Breast Cancer, N Engl J Med, Oct. 17, 2002, pp. 1233-1241, vol. 347 No. 16, Massachusetts Medical Society.

\* cited by examiner

*Primary Examiner* — Alexander H Taningco
(74) *Attorney, Agent, or Firm* — Peter Withstandley

(57) ABSTRACT

Described herein is a method and system for facilitating automatic classification of regions-of-interest (ROIs). Contrast enhanced image data may be received (202) and processed to generate at least one texture value of at least one ROI in the image data (204). The ROI may be automatically classified as either a mass or a non-mass like enhancement (NMLE) based on the texture value (e.g., bumpiness) (208).

18 Claims, 5 Drawing Sheets

300

SYSTEM AND METHOD FOR AUTOMATICALLY CLASSIFYING REGIONS-OF-INTEREST

CROSS-REFERENCE TO RELATED APPLICATION

The present application claims the benefit of U.S. provisional application No. 61/110,617 filed Nov. 3, 2008, the entire contents of which are herein incorporated by reference.

TECHNICAL FIELD

The present disclosure relates generally to image analysis, and more particularly to a system and method for automatically classifying regions of interest in image analysis.

BACKGROUND

Various imaging systems and tools have been developed to assist physicians, clinicians, radiologists, etc. in evaluating medical images to diagnose medical conditions. For example, computer-aided detection (CAD) tools have been developed for various clinical applications to provide automated detection of abnormalities in medical images, such as colonic polyps and other abnormal anatomical structures such as lung nodules, lesions, aneurysms, calcification, in breast, heart or artery tissue, etc.

A common medical imaging technique is magnetic resonance imaging (MRI), which uses a powerful magnetic field to image the internal structure and certain functionality of a body. MRI is particularly suited for imaging soft tissue structures and is thus highly useful in the field of oncology for the detection of breast lesions.

Dynamic contrast-enhanced MRI (DCE-MRI) allows for many additional details pertaining to bodily soft tissue to be observed, to further aid in diagnosis and treatment of detected lesions. DCE-MRI may be performed by acquiring a sequence of magnetic resonance (MR) images that span a time before a magnetic contrast agent is introduced into the patient's body and a time after the magnetic contrast agent is introduced. By imaging the patient's body sequentially, a set of images may be acquired that illustrate how the magnetic contrast agent is absorbed and washed out from various portions of the patient's body. This absorption and wash-out information may be used to characterize various internal structures within the body and provide additional diagnostic information.

When radiologists read DCE-MR images, the first decision to make is typically to determine whether a lesion is a mass or a non-mass-like enhancement (NMLE). According to the Breast Imaging Reporting and Data Systems (BI-RADS) lexicon developed by the American College of Radiology (ACR), a mass refers to a three-dimensional space-occupying lesion formed by a single process, while an NMLE refers to an enhancement of an area that is not a mass, formed by multiple processes. For example, in a cancerous NMLE lesion, multiple cores where the cancer started its growth can be observed.

Regardless of whether radiologists base their descriptions on the BI-RADS lexicon, the discrimination between a mass and an NMLE is important because a mass is connotative of more malignancy than an NMLE. For example, a mass may be an invasive carcinoma, while an NMLE may be a carcinoma in situ, which is less malignant than an invasive carcinoma. When a benign lesion is a mass, it is often a fibroadenoma; a benign NMLE object may be a mere post operational scar.

Therefore, based on the discussion above, there is a need for a technology that automatically discriminates between a mass and an NMLE.

SUMMARY

A technology for facilitating automatic classification of regions-of-interest (ROIs) is described herein. The technology may include receiving contrast-enhanced image data and processing the contrast-enhanced image data to generate at least one texture value of at least one ROI in the image data. The ROI may be automatically classified as either a mass or a non-mass like enhancement (NMLE) based on the texture value (e.g., bumpiness).

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present systems and methods and in order to meet statutory written description, enablement, and best-mode requirements. However, it will be apparent to one skilled in the art that the present systems and methods may be practiced without the specific exemplary details. In other instances, well-known features are omitted or simplified to clarify the description of the exemplary implementations of present systems and methods, and to thereby better explain the present systems and methods. Furthermore, for ease of understanding, certain method steps are delineated as separate steps; however, these separately delineated steps should not be construed as necessarily order dependent in their performance.

The following description sets forth one or more implementations of systems and methods that facilitate image analysis. In particular, one aspect of the present technology automatically classifies a region-of-interest (ROI) as a mass and a non-mass-like enhancement (NMLE) by measuring the texture value of the ROI. The texture value may include, for example, bumpiness of the ROI. Alternatively, the texture value may include a ratio of $r^3$ to the number of voxels above a pre-determined threshold in a sphere, wherein r is a radius of a sphere centered at the ROI's centroid. In another aspect of the present technology, ROIs are automatically clustered based on their distances from each other. This further refines the segmentation and allows for more accurate assessment of the size of lesions.

It is noted that, while a particular application directed to analysis of lesions in breast MRI is shown, the technology is not limited to the specific embodiment illustrated. The present technology has application to, for example, other types of images obtained by other imaging techniques (e.g., computed tomographic (CT), helical CT, x-ray, positron emission tomographic, fluoroscopic, ultrasound and single photon emission computed tomographic (SPECT)), and other types of anatomical features, such as the lung, prostate, kidney, liver or brain.

Figure 1:
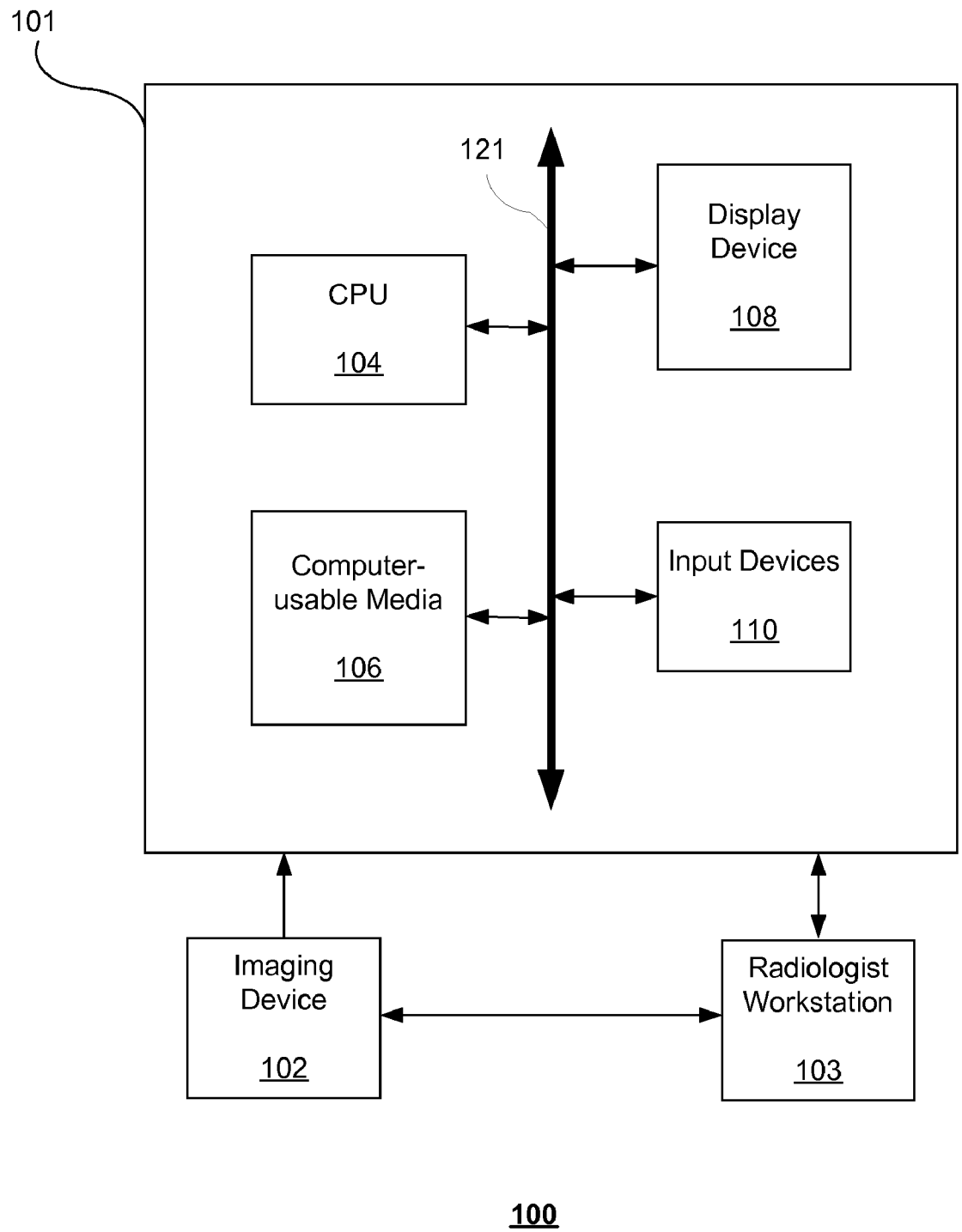
FIG. 1 shows a block diagram illustrating an exemplary CAD system.

FIG. 1 shows a block diagram illustrating an exemplary CAD system 100. The CAD system 100 includes a computer system 101 for implementing the framework as described herein. The computer system 101 may be further connected to an imaging device 102 and a radiologist workstation 103, over a wired or wireless network. The imaging device 102 may be a radiology scanner such as a MR scanner or a CT scanner.

Computer system 101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 101 comprises a processor or central processing unit (CPU) 104 coupled to one or more computer-usable media 106 (e.g., computer storage or memory), display device 108 (e.g., monitor) and various input devices 110 (e.g., mouse or keyboard) via an input-output interface 121. Computer system 101 may further include support circuits such as a cache, power supply, clock circuits and a communications bus.

It is to be understood that the present technology may be implemented in various forms of hardware, software, firmware, special purpose processors, or a combination thereof. In one implementation, the techniques described herein may be implemented as computer-readable program code tangibly embodied in computer-usable media 106. Computer-usable media 106 may include random access memory (RAM), read only memory (ROM), magnetic floppy disk, flash memory, and other types of memories, or a combination thereof. The computer-readable program code may be executed by CPU 104 to process images (e.g., MR or CT images) from the imaging device 102 (e.g., MR or CT scanner). As such, the computer system 101 is a general-purpose computer system that becomes a specific purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein.

Computer system 101 may also include an operating system and microinstruction code. The various techniques described herein may be implemented either as part of the microinstruction code or as part of an application program or software product, or a combination thereof, which is executed via the operating system. Various other peripheral devices, such as additional data storage devices and printing devices, may be connected to the computer system 101.

The radiologist workstation 103 may include a computer and appropriate peripherals, such as a keyboard and display, and can be operated in conjunction with the entire CAD system 100. For example, the radiologist workstation 103 may communicate with the imaging device 102 so that the image data collected by the imaging device 102 can be rendered at the radiologist workstation 103 and viewed on the display. The radiologist workstation 103 may include a user interface that allows the radiologist or any other skilled user (e.g., physician, technician, operator) to manipulate the image data. For example, the radiologist may identify regions of interest in the image data, or annotate the regions of interest using pre-defined descriptors via the user-interface. Further, the radiologist workstation 103 may communicate directly with the computer system 101 to access and display previously processed image data so that a radiologist can manually verify the results of the present framework (e.g., classification results).

Figure 2:
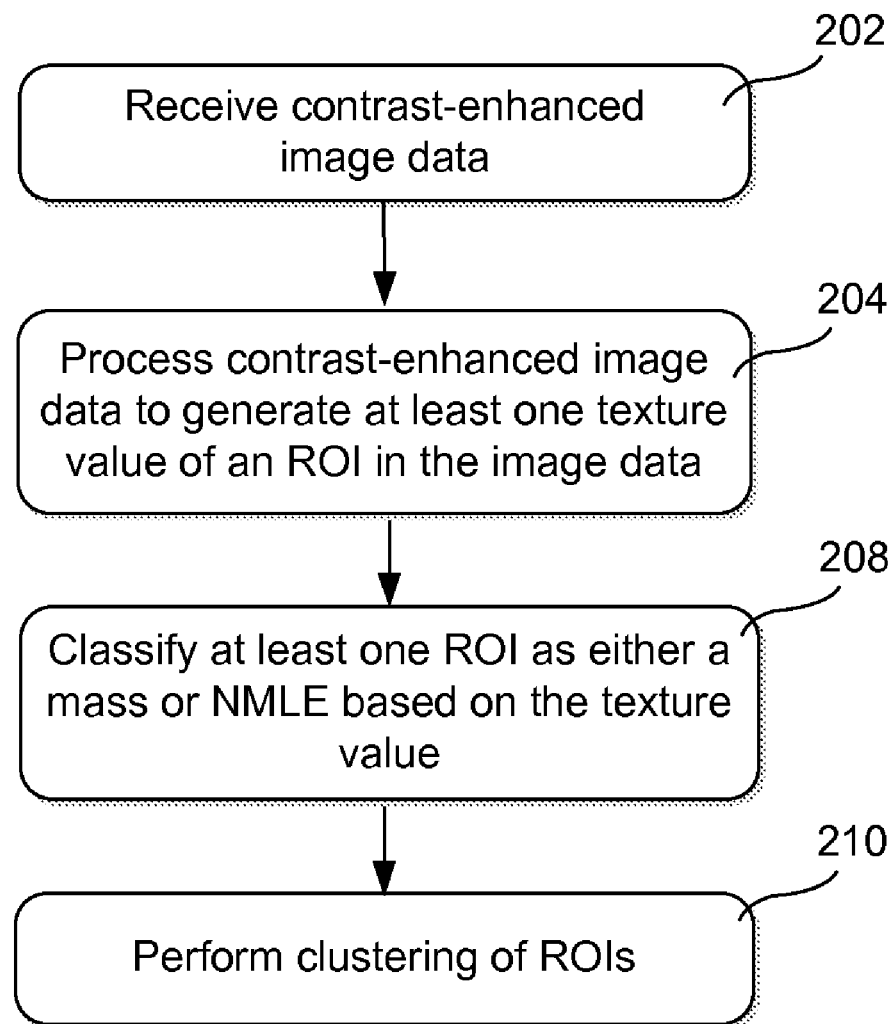
FIG. 2 shows an exemplary method which may be implemented by the CAD system.

FIG. 2 shows an exemplary method 200 which may be implemented by the CAD system 100. In the discussion of FIG. 2, continuing reference will be made to elements and reference numerals shown in FIG. 1.

At step 202, the computer system 101 receives image data, including one or more contrast-enhanced images. The contrast-enhanced images may be provided to the computer system 101 by the imaging device 102. The imaging device 102 may have acquired the contrast-enhanced images by at least one of a magnetic resonance (MR) imaging, computed tomographic (CT), helical CT, x-ray, positron emission tomographic, fluoroscopic, ultrasound and single photon emission computed tomographic (SPECT) technique. Other types of modalities may also be used to acquire the images. In one implementation, the contrast-enhanced image data comprises at least one medical image of an anatomical part (e.g., breast, colon, or lung). The contrast-enhanced image may be binary (e.g., black and white) or grayscale. In addition, the image may comprise two dimensions, three dimensions or any other number of dimensions.

The image data may be pre-processed, either automatically by the computer system 101, manually by a skilled user (e.g., radiologist), or a combination thereof. In one implementation, the images are pre-filtered and contrast-enhanced by injecting a contrast agent (CA) into a patient. The images may include Dynamic Contrast-Enhanced MR images obtained by measuring CA concentration in lesions over time. Other types of pre-processing operations may also be performed on the images.

Pre-processing the images may also include segmenting the images to delineate or identify regions of interest (ROIs). An ROI refers to a volume or area (e.g., central slice of the volume) identified for further study and processing. In particular, an ROI may be associated with an abnormal medical condition. For example, the ROI may represent a potentially malignant lesion, tumor, mass or NMLE in the patient's body. The computer system 101 may automatically detect the ROI using a computer-aided detection technique, such as one that detects points where the increase in voxel intensity is above a certain threshold. Alternatively, the ROI may be identified manually by, for example, a skilled user via a user-interface at the radiologist workstation 103.

At 204, the computer system 101 processes the contrast-enhanced image data to generate at least one texture value of at least one ROI in the image data. A texture value is a property that is calculated to quantify the perceived texture of an image. The texture value is preferably indicative of the level of malignancy of the ROI. In one implementation, the texture value is used to determine if the ROI corresponds to a mass or an NMLE. As discussed previously, a mass is typically indicative of a higher level of malignancy than an NMLE.

In one implementation, the texture value comprises "bumpiness" of the ROI. The texture value may also correspond to other types of texture, such as co-occurrence matrix, Gabor filters, wavelets, or Linear Binary Patterns (LBPs). "Bumpiness" refers to variations in the intensity values of the contrast-enhanced image. It may be measured by counting the number of "bumps" in the ROI. Other methods of measuring "bumpiness," such as wavelet analysis in different scales, may also be used. A "bump," as used herein, refers to a local maximum of enhancement. A point is a local maximum if it is larger than any value of enhancement within a given neighborhood.

Figure 3:
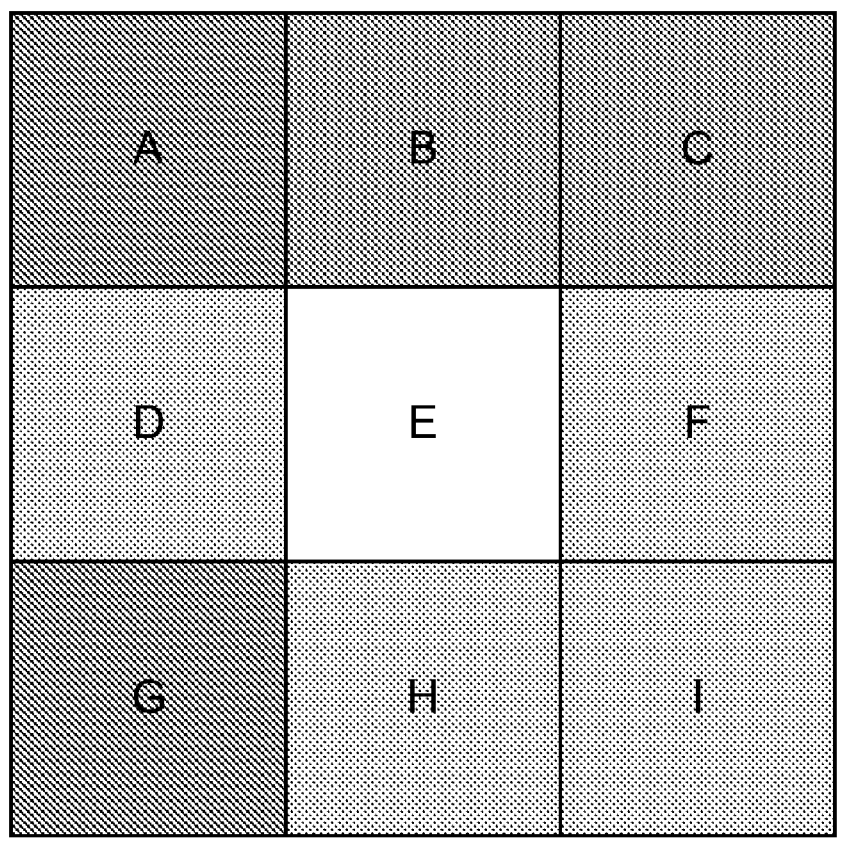
FIG. 3 shows a neighborhood of voxels defined in an ROI.

The neighborhood of a point is typically defined as a set of points adjacent to the point in question. For example, FIG. 3 shows a mask 300 defining a neighborhood of 9 voxels (A-I). Voxel E is automatically detected as the local maximum because its intensity is higher than the intensities of the surrounding points. Other ways of defining the neighborhood, such as by using a mask with a different shape (e.g., rectangular, circular, oval) or a different number of voxels, may also be useful. Although a two-dimensional mask is shown, it should be noted that the mask may include three or more dimensions.

In addition, or alternatively, the texture value comprises a function of r, where r is the radius of a sphere centered at the ROI's centroid. For example, the texture value comprises a ratio (F) of $r^3$ to the number of voxels above a first pre-determined threshold in a sphere. Other functions of r may also be used. When r varies from 0 to the maximum radius of the ROI, the ratio (F) changes its value as a function of r.

To determine whether the ROI is a mass or NMLE, the effect on the ratio (F) caused by varying the first pre-determined threshold may be observed. In one implementation, the first pre-determined threshold is increased from an initial value. The initial value may be determined empirically. For example, the initial value may be 30% of the maximum enhancement in the entire ROI. The first pre-determined threshold may be increased by fixed increments. For example, the first pre-determined threshold may be increased at fixed increments of 10% of the maximum enhancement value in the entire ROI. Variable increments may also be used. The first pre-determined threshold may be increased until it reaches the maximum enhancement value in the ROI.

At 208, the computer system 101 classifies at least one ROI as either a mass or an NMLE. The classification may be performed based on the texture value obtained in step 204 as described above. For example, if the total texture value (e.g., bumpiness) of an ROI is above a second pre-determined threshold, the ROI is classified as an NMLE. Otherwise, the ROI is classified as a mass.

Alternatively, or in addition, the classification may be performed based on the ratio (F). For example, the ratio (F) falls at a more rapid rate for an NMLE than for a mass when the first pre-determined threshold is varied. The rate as used herein refers to the change in F per unit change in the first pre-determined threshold. For purposes of illustration, suppose that the radius of the smallest sphere that encompasses the ROI is R, and that the ratio (F) at r=0.5R is observed. If F(0.5R) falls at a rate that is above a third pre-determined threshold when the first pre-determined threshold is increased, the ROI is classified as an NMLE; otherwise, the ROI is classified as a mass.

At 210, the computer system 101 performs clustering of at least first and second ROIs based on a merger criterion. The clustering step 210 may also be performed before steps 204 and 208, such that the classification is performed on clustered ROIs. Clustering can be performed to further refine the segmentation and to ensure that each segmented ROI captures most of the neighboring processes. This is important since the initial segmentation may not be correct (i.e. initially segmented ROIs may contain only a part of the processes in an NMLE). One advantage of clustering is that ensures that the size of the lesion is more accurately assessed. If multiple lesions merge correctly, the possibility of underestimating the lesion size may be reduced. The size of the lesion is typically used to determine the type of treatment. For example, a lesion larger than 20 mm may be classified as Stage II cancer while a smaller one may be Stage I cancer. A patient with a lesion larger than 50 mm may have to undergo mastectomy. The prognosis of a lesion after the treatment also significantly affects the recurrence and survival rates of patients.

Two or more ROIs are merged if a merger criterion is satisfied. In one implementation, the merger criterion is satisfied if the shortest distance between the ROIs is less than a fourth pre-determined threshold value (e.g., 5 mm) The shortest distance may refer to the distance between the nearest first and second points along respective first and second margins corresponding to the first and second ROIs. To find the shortest distance, various methods can be employed. One method comprises calculating the distances between all pairs of points found along the margins of the first and second ROIs.

Figure 4:
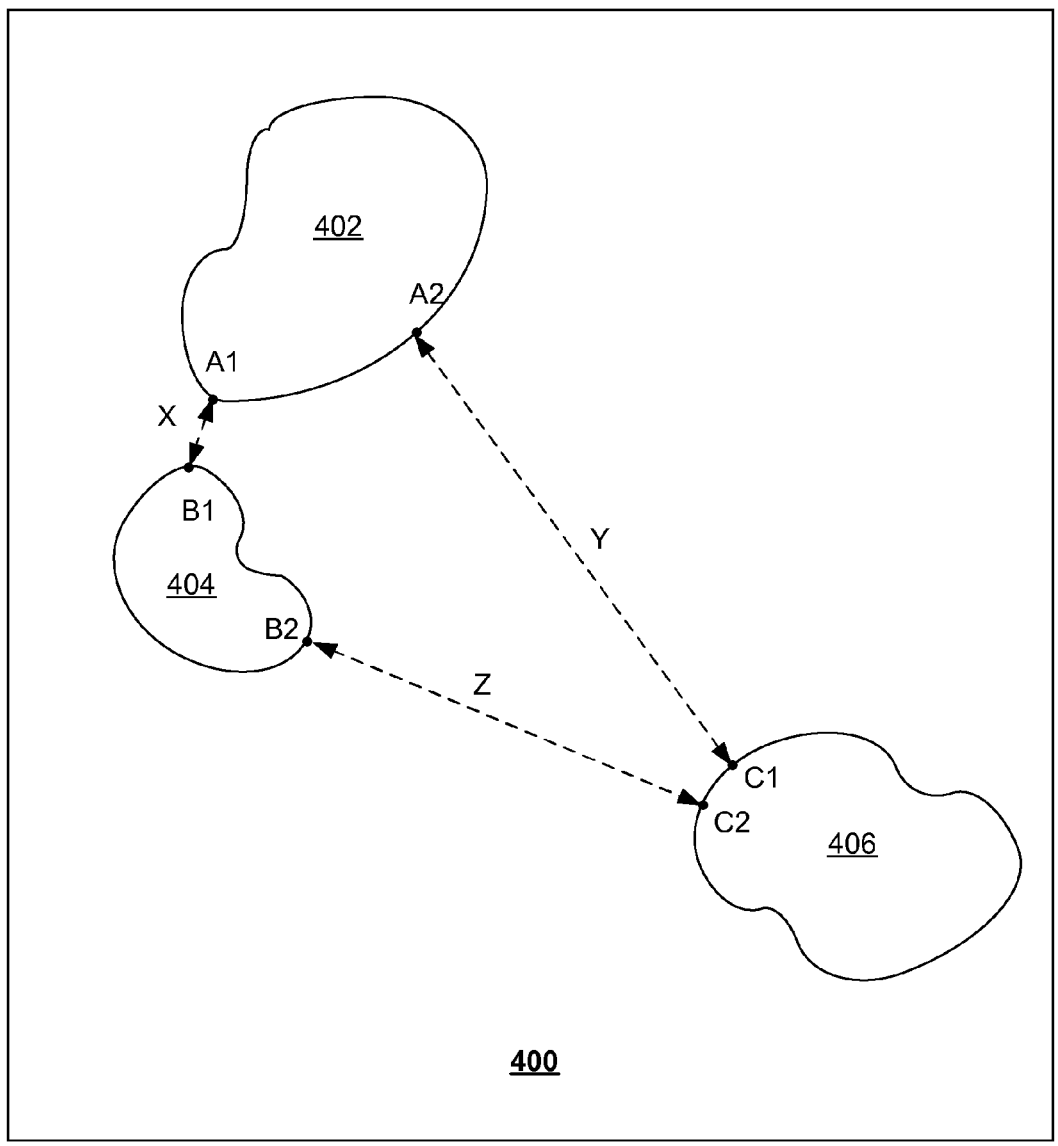
FIG. 4 shows a slice of image data with three exemplary ROIs.

For purposes of illustration, FIG. 4 shows a slice of image data 400 with three exemplary ROIs (402, 404 and 406). It is to be noted that although image data 400 is shown to be two-dimensional (2D), it can also include three or more dimensions. The shortest distance between ROIs 402 and 404 is the distance X between the nearest points A1 and B1. Similarly, the shortest distance between ROIs 402 and 406 is the distance Y between the nearest points A2 and C1, and the shortest distance between ROIs 404 and 406 is the distance Z between the nearest points B2 and C2.

Alternatively, the merger criterion is based on the distance between bounding volumes of the ROIs. A bounding volume is a closed volume that completely surrounds at least one ROI. The bounding volume may be automatically generated by the computer system 101. In one implementation, the bounding volume comprises a bounding box. A bounding box refers to an expression of the minimum and maximum extents of an ROI within its coordinate system. In a three-dimensional (x, y, z) coordinate system, for example, the bounding box is expressed by min(x), max(x), min(y), max(y), min(z) and max(z). Other types of bounding volumes, such as a bounding sphere, ellipsoid, or cylinder, may also be used. In addition, the bounding volume may include two-dimensions, three-dimensions or any other number of dimensions. The use of bounding volumes advantageously reduces the computational requirements of measuring the distances between ROIs, since fewer pairs of coordinates need to be processed to compute the distances.

Figure 5:
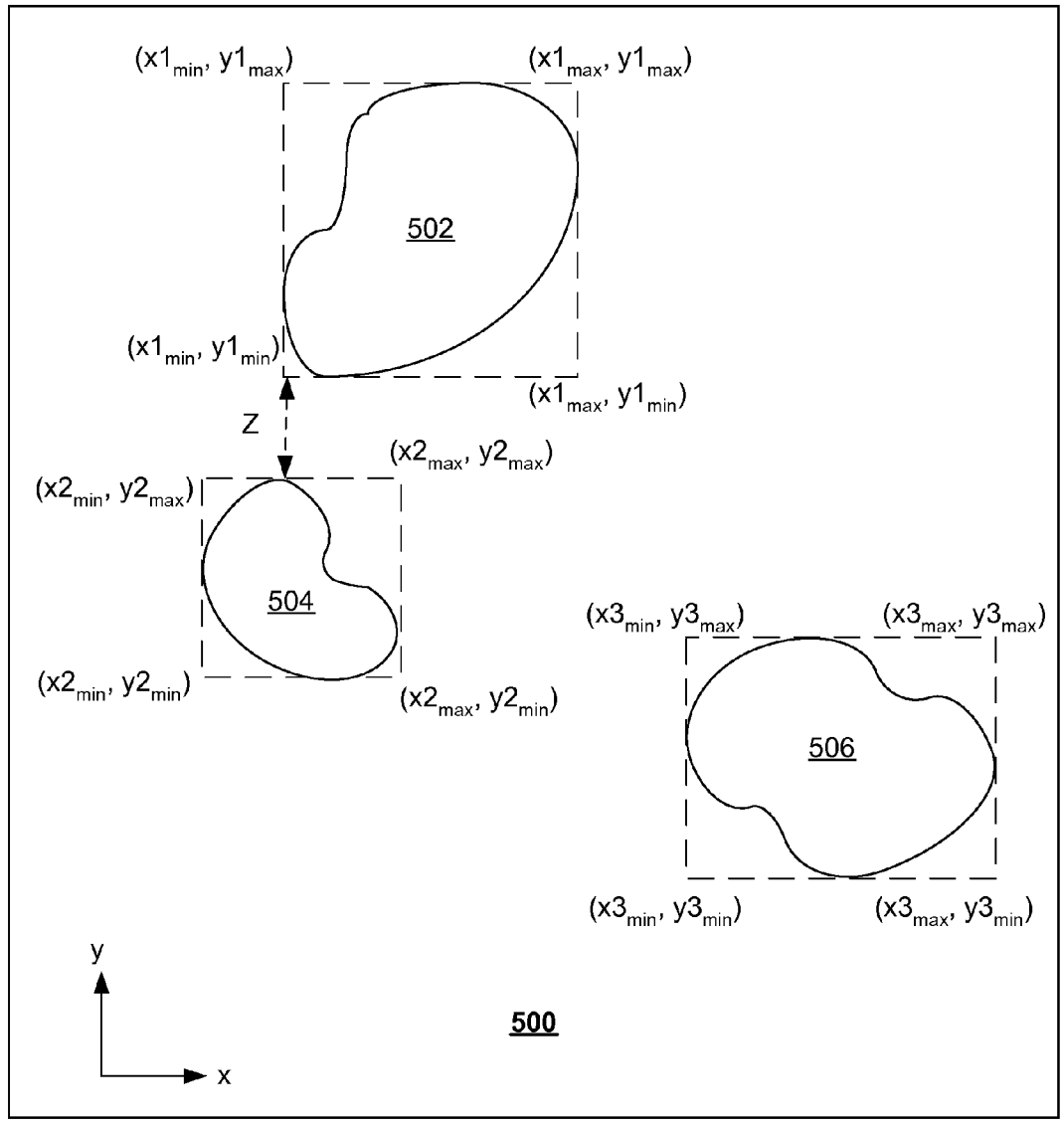
FIG. 5 shows another slice of image data with three exemplary ROIs surrounded by bounding boxes.

FIG. 5 shows a slice of image data 500 with three exemplary ROIs (502, 504 and 506) surrounded by bounding boxes. Although a 2D representation is shown, it should be noted that the present technology may be extended to three or more dimensions. The bounding box of each ROI may be constructed by finding the minimum and maximum values of the x-coordinates ($x_{min}$, $x_{max}$) and the minimum and maximum values of the y-coordinates ($y_{min}$, $y_{max}$) of the ROI. The four corners of each bounding box may then be defined by the 4 vertices ($x_{min}$, $y_{min}$), ($x_{min}$, $y_{max}$) ($x_{max}$, $y_{min}$) and ($x_{max}$, $y_{max}$). Other methods of defining the bounding box may also be used.

Two or more ROIs merge if the smallest bounding volumes containing the ROIs are within a pre-determined distance. In one implementation, the merger criterion is satisfied if the distance between at least one point along an edge of a first bounding box and at least one point along an edge of a second bounding box is less than a pre-determined distance. For example, referring to FIG. 5, ROIs 502 and 504 may merge if the distance (Z) between a point along the line connecting ($x1_{min}$, $y1_{min}$) and ($x1_{max}$, $y1_{min}$) and a point along the line connecting ($x2_{min}$, $y2_{max}$) and ($x2_{max}$, $y2_{max}$) is less than the pre-determined distance. The pre-determined distance may be, for example, 5 mm. Other values may also be useful. It has been found that this exemplary bounding box criterion corresponds well with human psychology; two lesions look like a single group if their bounding boxes are close.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method, comprising:
   (a) receiving, by a computer system, contrast-enhanced image data;
   (b) processing, by the computer system, the contrast-enhanced image data to generate at least one texture value of a region-of-interest (ROI), wherein the texture value comprises a function of r, wherein r is a radius of a sphere centered at the ROI's centroid and wherein the texture value comprises a ratio of r3 to number of voxels above a first pre-determined threshold in a sphere; and
   (c) classifying, by the computer system, the ROI as either a mass or a non-mass-like enhancement (NMLE) based on the texture value; and
   displaying by the computer system, the ROI and classification of the ROI.

2. The method of claim 1 further comprising: acquiring, by an imaging device, the contrast-enhanced image data by at least one of a magnetic resonance (MR) imaging, computed tomographic (CT), helical CT, x-ray, positron emission tomographic, fluoroscopic, ultrasound and single photon emission computed tomographic (SPECT) technique.

3. The method of claim 1 wherein said contrast-enhanced image data comprises at least one image of an anatomical part.

4. The method of claim 1 further comprising segmenting, by the computer system, the contrast-enhanced image data into the at least one ROI.

5. The method of claim 1 wherein the texture value comprises bumpiness of the ROI.

6. The method of claim 5 wherein step (b) comprises counting, by the computer system, number of bumps in the ROI.

7. The method of claim 5 wherein step (b) comprises using a wavelet analysis-based technique to determine the bumpiness.

8. The method of claim 1 wherein step (c) comprises classifying the ROI as an NMLE if the texture value exceeds a second pre-determined threshold.

9. The method of claim 1 wherein step (c) comprises classifying the ROI as an NMLE if the ratio falls at a rate that is above a third pre-determined threshold when the first pre-determined threshold is varied.

10. The method of claim 1 further comprising: (d) clustering, by the computer system, at least first and second ROIs based on a merger criterion, wherein the clustering is performed prior to classifying the ROIs as either a mass or a NMLE based on the texture value.

11. The method of claim 10 wherein the merger criterion comprises a shortest distance between the first and second ROIs being less than a fourth pre-determined threshold.

12. The method of claim 10 further comprising determining a bounding volume surrounding each ROI.

13. The method of claim 12 wherein the bounding volume comprises a bounding box.

14. The method of claim 12 wherein the merger criterion comprises first and second bounding volumes corresponding to the first and second ROIs respectively being within a pre-determined distance.

15. A non-transitory computer usable medium having a computer readable program code tangibly embodied therein, said computer readable program code adapted to be executed by a processor to implement a method comprising:
   (a) receiving contrast-enhanced image data;
   (b) processing the contrast-enhanced image data to generate at least one texture value of a region-of-interest (ROI), wherein the texture value comprises a function of r, wherein r is a radius of a sphere centered at the ROI's centroid and wherein the texture value comprises a ratio of r3 to number of voxels above a first pre-determined threshold in a sphere; and
   (c) classifying the ROI as either a mass or a non-mass-like enhancement (NMLE) based on the texture value.

16. The computer usable medium of claim 15 wherein the method further comprises: (d) clustering at least first and second ROIs based on a merger criterion.

17. A system, comprising:
   a memory device for storing computer readable program code; and
   a processor in communication with the memory device, the processor being operative with the computer readable program code to:
   (a) receive contrast-enhanced image data;
   (b) process the contrast-enhanced image data to generate at least one texture value of a region-of-interest (ROI), wherein the texture value comprises a function of r, wherein r is a radius of a sphere centered at the ROI's centroid and wherein the texture value comprises a ratio of r3 to number of voxels above a first pre-determined threshold in a sphere; and
   (c) classify the ROI as either a mass or a non-mass-like enhancement (NMLE) based on the texture value.

18. The system of claim 17 wherein the contrast-enhanced image data comprises at least one dynamic contrast-enhanced MR image.

* * * * *